March 10, 1931.  A. MEYER  1,795,311

STEAM TURBINE SEALING DEVICE

Filed March 6, 1925

Inventor —
Adolf Meyer
by Hubert E Peck
atty

Patented Mar. 10, 1931

1,795,311

UNITED STATES PATENT OFFICE

ADOLF MEYER, OF KUSNACHT, NEAR ZURICH, SWITZERLAND, ASSIGNOR TO AKTIEN-GESELLSCHAFT BROWN BOVERI & CIE., OF BADEN, SWITZERLAND

STEAM-TURBINE-SEALING DEVICE

Application filed March 6, 1925, Serial No. 13,484, and in Germany March 24, 1924.

This invention has reference to stuffing boxes for revolving shafts driven at high speed and which closely surround the shaft.

The invention has for its object to overcome the disadvantages that pertain to such stuffing boxes, especially those employed to prevent the escape of steam from a steam-containing casing. The invention is particularly applicable in connection with steam turbines and in such connection it will be hereafter fully rescribed.

It has been found that stuffing boxes for revolving shafts driven at high speed and closely surrounding the shaft are only reliable when used in connection with centrifugal pumps and that the reliability is due to the fact that the parts of the pump in the vicinity of the stuffing box are maintained cool and that the rubbing surfaces are also maintained cool and lubricated.

It has been proposed to reproduce similar working conditions in stuffing boxes that are used, for example, with steam containing casings, such as steam turbines, by forcing water through the packing. For this purpose it has been suggested to use the condensate of the steam that is to be prevented from escaping, and to force the condensate by a pump between the packing and the shaft or to use the condensate of the steam leaking into a stuffing box provided with a cooling sleeve. The first suggestion has the disadvantage of requiring a special pump. On the other hand tests have shown that unless special provision is made inside the stuffing box the condensation of a sufficient quantity of steam to ensure cooling and lubrication will not be successful.

The present invention has for its object to overcome these disadvantages and, in accordance therewith, a heat exchanging body, such as a condenser, in which sufficient condensate will always be produced and cooled to ensure the tightness, lubrication and cooling of the packing, is provided in connection with a stuffing box and is interposed between the steam containing casing and the packing, the condenser receiving steam from the steam containing casing and delivering the condensate to the stuffing box. The pressure existing within the steam containing casing will cause the condensate to flow towards the packing and to be forced between the packing and the shaft. By these means, the rotating shaft and the packing will be packed, lubricated and cooled. In order to ensure the heat being conducted away with certainty from the frictional surfaces, cooling means may be provided in connection therewith.

In order that the invention may be clearly and readily understood, reference will now be made to the accompanying drawings, on which three several embodiments of the invention are illustrated, the lower half of each figure being omitted for the sake of clearness.

The several embodiments differ from one another only in respect of the construction of the heat exchanging body in and by which the condensate required to ensure the tightness, lubrication and cooling of the packing is produced.

Figure 1:
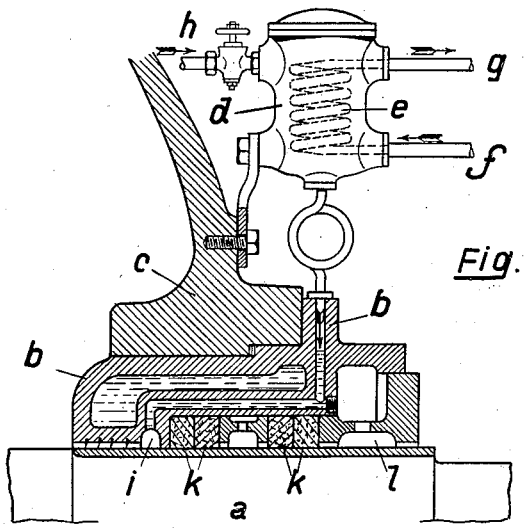
Fig. 1 is a sectional view of one embodiment.

In the embodiment illustrated in Fig. 1, the heat exchanging body, e. g., a condenser is placed outside the steam containing casing. $a$ is the shaft, for example, of a steam turbine, $b$ is the stuffing box, $c$ is the turbine casing and $d$ is the condenser. The condenser consists of a cylinder within which is arranged a coil $e$. Water is supplied to the coil $e$ at one end by a pipe $f$ and is discharged through a pipe $g$. The cylinder of the condenser $d$ is connected with the turbine casing $c$ through a pipe $h$ and the condensate passes to an annular chamber $i$ which is situated between the turbine $c$ and packing $k$. The packing $k$ may consist of hemp, asbestos or like rings, carbon rings, white metal rings or the like. The annular chamber is in connection with the interior of the turbine casing $c$, the steam in which acts on the condensate collected in the annular chamber $i$ and forces it between the packing $k$ and the shaft $a$ to a chamber $l$ from which it is led away. If necessary, the steam to form the condensate may be derived from a stage of the turbine at a higher pressure than that existing in the part of the turbine casing adjacent the stuffing box. Any condensate that finds its way towards or into the interior of the turbine casing is re-evaporated either on the hot shaft within the stuffing box or on the walls of the turbine casing.

Figure 2:
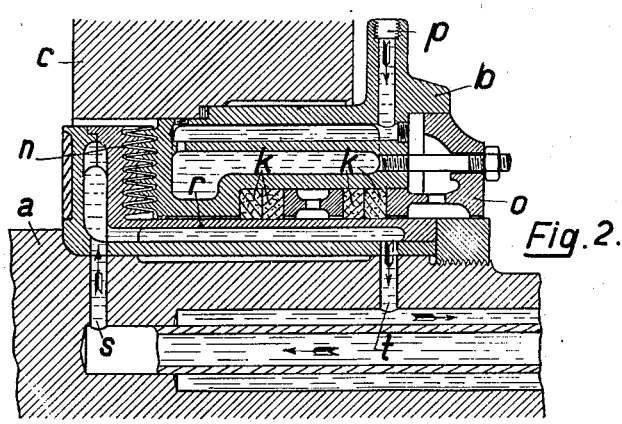
Fig. 2 is a similar view of another embodiment; and

In the construction illustrated in Fig. 2 the condenser is within, and situated towards the inner end of, the stuffing box. The condenser surrounds the shaft $a$, is concentric therewith and consists of a plurality of ducts $n$ communicating with one another and forming in effect a zig-zag path. The ducts are in connection at one end with the interior of the turbine casing $c$ and at the other end with the packing $k$. The packing $k$ is acted on by the gland $o$. The stuffing box $b$ is cooled by water which enters at $p$ and is discharged at a suitable point in the lower part not shown).

Provision is also made for cooling the shaft $a$. The packing $k$ is not directly in contact with the shaft $a$ but with a hollow sleeve $r$ which encircles the shaft and through which water flows. The supply of water to the sleeve $r$ may be effected, as shown, through the interior of the shaft $a$, the water entering through a passage $s$ and leaving through a passage $t$. The condenser is, as shown, subject on its opposite sides to the cooling action of the water in the stuffing box and in the sleeve $r$. Instead of water, oil can be used and can be obtained from the lubrication service and oil circuit of the governing means of the steam turbine.

Figure 3:
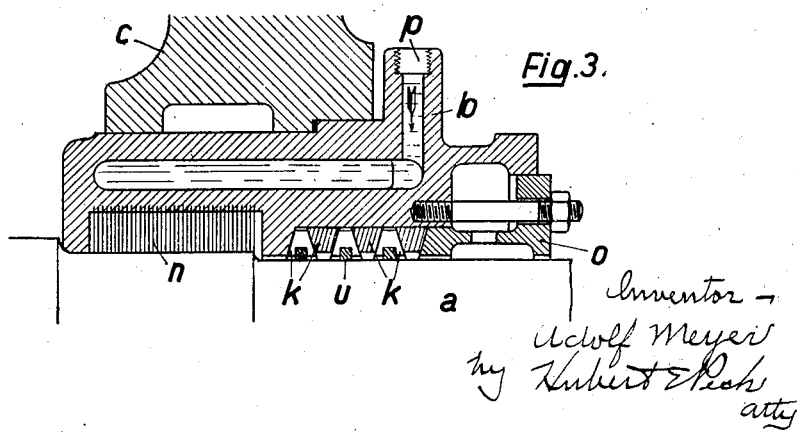
Fig. 3 is a like view of a third embodiment.

The principal differences in the embodiment illustrated in Fig. 3 from that shown in Fig. 2 consist in the condenser $n$ and in the packing $k$. The condenser $n$ consists of radial sheet metal laminations that are arranged within and towards the inner end of the stuffing box $b$ which is water cooled. The laminations are secured in position by caulking, soldering, welding or the like, and act on the one hand as a labyrinth packing and on the other hand as condensing surfaces on which the steam passing from the turbine casing is condensed.

In installations in which steam at high pressure is employed it is necessary to employ metallic packing, and in carrying out this invention metallic packing as illustrated in Fig. 3 may be used, such packing being composed of conical ring segments $k$ which are forced by the steam pressure partly outwards against the wall of the stuffing box $b$ and partly inwards, supporting rings $u$ being provided to give the inwardly-pressed ring segments sufficient clearance to prevent the shaft $a$ from being gripped too tightly and also to avoid an excess of packing water.

The area of the surface of the condenser $n$ must be such that it produces sufficient condensate and cools it to such an extent that it will serve for packing, lubricating and cooling. The quantity of condensate can be varied to suit different loads, i. e. different pressures of steam in the turbine casing, by altering the quantity of cooling liquid passing through the cylinder $d$ (Fig. 1), stuffing box and hollow sleeve $r$ (Fig. 2) or stuffing box (Fig. 3) to suit the conditions of working. In general, heavy loads will require more and lighter loads less cooling liquid. The adjustment of the quantity of cooling liquid can in all cases be effected by means of automatically acting devices dependent upon the load or the pressure of steam in the interior of the turbine casing or other devices responsive to the operating conditions of the machine. Under all circumstances the quantity of steam which is so continuously condensed is only a fraction of the quantity that would flow through an ordinary labyrinth packing.

From the foregoing it will be seen that the present improved construction provides for better characteristics of operation than has been the case in constructions of this general type used heretofore, and that such better characteristics of operation are realized by the present improved combination or arrangement of the parts wherein a condenser is provided for the purpose of insuring for an adequate supply of condensate for sealing, lubricating and cooling the stuffing box, the condenser being provided with a suitable cooling water supply to increase the condensing action thereof to the necessary degree. It will further be seen that in the present improved construction the condenser is connected in series with the turbine casing and the packing, the condenser being interposed between the turbine casing and packing in such series. Such combination or arrangement provides, first, for the flow of steam under the proper pressure from the turbine casing into the condenser, second, for condensation of the steam received by the condenser in such amounts as to provide at all times an adequate supply of condensate and, third, for the flow of the condensate under the influence of the steam pressure outwardly with respect to the turbine casing and between the shaft and packing therefor. In Figs. 2 and 3 the condensing means $n$ is so constructed and disposed that the same operates in some degree as a packing, and provides a packing action supplementing such action of packing $k$.

What I claim is:—

1. In a sealing gland for turbines, a casing receiving a condensible fluid under pressure, a shaft rotatable within and extending through said casing, a stuffing box arranged between said casing and said shaft, said stuffing box being provided with a chamber to receive a cooling medium for condensing a portion of the fluid contacting therewith, packing means sealing said shaft and said stuffing box in substantially fluid-tight relation, and a condenser separate from said stuffing box and connected with a source of condensible fluid, said condenser supplying condensed fluid between said stuffing box and said shaft.

2. In a sealing gland structure for steam turbines, a casing; a shaft rotatable within and extending through said casing in spaced relation therewith; packing means arranged between said casing and said shaft, said packing means including a stuffing box spaced from said shaft and being provided with a chamber to receive a cooling medium for condensing the steam leaking through the space between said shaft and said stuffing box, and packing compressed into substantially fluid-tight contact with said shaft and said stuffing box, said stuffing box being formed to provide an annular chamber around said shaft, and a condenser separate from said stuffing box and connected with a source of steam, said condenser supplying condensate to the annular chamber.

Dated this 5th day of February, 1925.

A. MEYER.